(No Model.)

F. KING.
ELECTRIC STORAGE OR SECONDARY BATTERY.

No. 586,044. Patented July 6, 1897.

Witnesses

Inventor
Frank King

THE NORRIS PETERS CO., PHOTO-LITHO., WASHINGTON, D. C.

UNITED STATES PATENT OFFICE.

FRANK KING, OF LONDON, ENGLAND, ASSIGNOR TO JOHN IRVING COURTENAY, OF SAME PLACE.

ELECTRIC STORAGE OR SECONDARY BATTERY.

SPECIFICATION forming part of Letters Patent No. 586,044, dated July 6, 1897.

Application filed January 26, 1897. Serial No. 620,829. (No model.)

*To all whom it may concern:*

Be it known that I, FRANK KING, engineer, a subject of the Queen of Great Britain and Ireland, residing at 4 Great Winchester Street, in the city of London, England, have invented certain Improvements in Electric Storage or Secondary Batteries, of which the following is a specification.

The objects of my invention are to effectually secure the active material, or the material to be rendered active, in place on the plate or support and to improve the efficiency of the battery generally.

According to my invention I employ a support or grid with perforations or openings extending through it from side to side, and I then paste or apply to the support or grid the active material, or material to be rendered active, and then I apply to the plate an adherent layer or layers of pure india-rubber, so as to form a coating or membrane extending over and firmly adhering to the plate. The coating may be applied by immersion or by successive immersions in a solution of india-rubber, or by painting on a layer or layers of such solution, or in any other suitable way. I then pierce through the india-rubber and active material, or material to be rendered active and situated in the openings through the support or grid, leaving a thickness of the said material on the inner walls of the said perforations in accordance with the size of the peforations or the thickness of the walls thereof—say, in ordinary cases, a thickness of such active material, or material to be rendered active, of from one sixteenth to one quarter of an inch.

Figure 1:
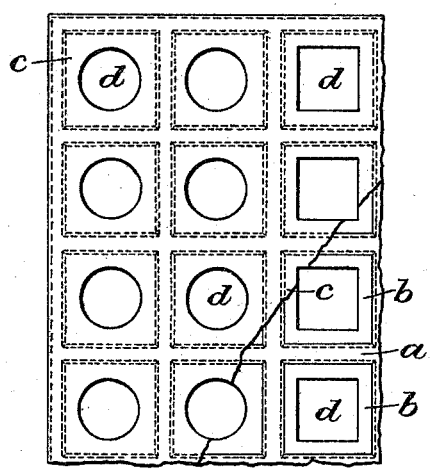
Figure 2:
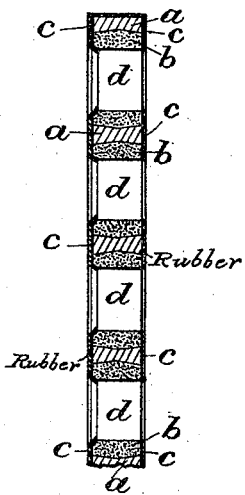

In the accompanying drawings, Figure 1 is a front view, and Fig. 2 is a transverse section, of a part of a plate provided with an india-rubber coating in accordance with my invention.

*a* is the support or grid, with perforations or openings extending through it.

*b* is the active material, or material to be rendered active, and *c* is the adherent coating or membrane of india-rubber applied as aforesaid.

*d* are the piercings made through the india-rubber and active material, or material to be rendered active.

The openings in the grid are shown square and some of the piercings are shown round and some square, but they may be of any suitable shape, and although I have shown but one piercing through each opening in the grid two or more smaller piercings can be made instead, if preferred.

When the plates thus made are in use, the electrolyte has access by the openings formed as aforesaid to the active material, or material to be rendered active, in each of the perforations, while the rubber coating holds the said material securely in place and by insulating the faces of the plates from each other causes the energy of the battery to be generated in the perforations, thus equalizing the action of the plate and preventing undue activity of the said material at its contact with the support or grid and also preventing sulfation at the contact between the conductor and the said material on the face of the plate.

Having now particularly described and ascertained the nature of my said invention and in what manner the same is to be performed, I declare that what I claim is—

A secondary battery element consisting of a plate or support having perforations therethrough containing active material or material to be rendered active, and having applied to the sides thereof an adherent coating or membrane of india-rubber, perforations being made through the rubber and through the active material, so that the electrolyte may have access to the active material through said perforations, the faces of the plate being protected from contact with the electrolyte by the adherent coating of rubber, substantially as described.

In testimony whereof I have signed my name to this specification in the presence of two subscribing witnesses.

FRANK KING.

Witnesses:
 WILLIAM F. UPTON,
 WM. JOHN WICKS.